United States Patent

Stumpe et al.

[11] Patent Number: 6,079,791
[45] Date of Patent: Jun. 27, 2000

[54] METHOD AND APPARATUS FOR CONTROLLING THE BRAKE SYSTEM OF A MOTOR VEHICLE

[75] Inventors: Werner Stumpe, Stuttgart; Roland Karrelmeyer, Ditzingen; Klaus-Dieter Leimbach, Moeglingen; Matthias Horn, Hardheim; Hans Veil, Eberdingen, all of Germany

[73] Assignee: Robert Bosch GmbH, Stuttgart, Germany

[21] Appl. No.: 08/912,577

[22] Filed: Aug. 18, 1997

[30] Foreign Application Priority Data

Aug. 17, 1996 [DE] Germany ................ 196 33 224

[51] Int. Cl.$^7$ .................................................. B60T 13/66
[52] U.S. Cl. .................... 303/7; 303/DIG. 3; 303/15; 303/DIG. 4; 303/155
[58] Field of Search ................... 303/7, 9.62, 9.66, 303/9.73, DIG. 1–DIG. 4, 15, 155, 20, 157, 158, 166, 167; 701/70, 79; 188/3 R, 314

[56] References Cited

U.S. PATENT DOCUMENTS

| | | |
|---|---|---|
| 4,749,238 | 6/1988 | Singleton et al. ................ 303/7 X |
| 5,050,938 | 9/1991 | Brearley et al. ................... 303/7 |
| 5,415,466 | 5/1995 | Breen et al. ...................... 303/7 |
| 5,551,765 | 9/1996 | Sich ................................ 303/7 |

FOREIGN PATENT DOCUMENTS 4112845 10/1992 Germany.

*Primary Examiner*—Douglas C. Butler
*Attorney, Agent, or Firm*—Fulbright & Jaworski, LLP

[57] ABSTRACT

A method and an apparatus for controlling the brake system of a vehicle consisting of at least two component vehicles are proposed, where at least one of these component vehicles is equipped with an electrically controlled brake system. As a function of the actuation of the brake pedal, nominal values for the control of the wheel brakes are formed. An actuating variable for controlling the wheel brakes of the second component vehicle is formed in this first component vehicle. During a braking operation of the complete vehicle, the actuating variable for one component vehicle is modified by a value which, in the event that the brakes of the first component vehicle are not engaged, is determined by adjustment of the actuating variable for the second component vehicle or by adjustment of the nominal values for the wheel brake of the first component vehicle.

24 Claims, 7 Drawing Sheets

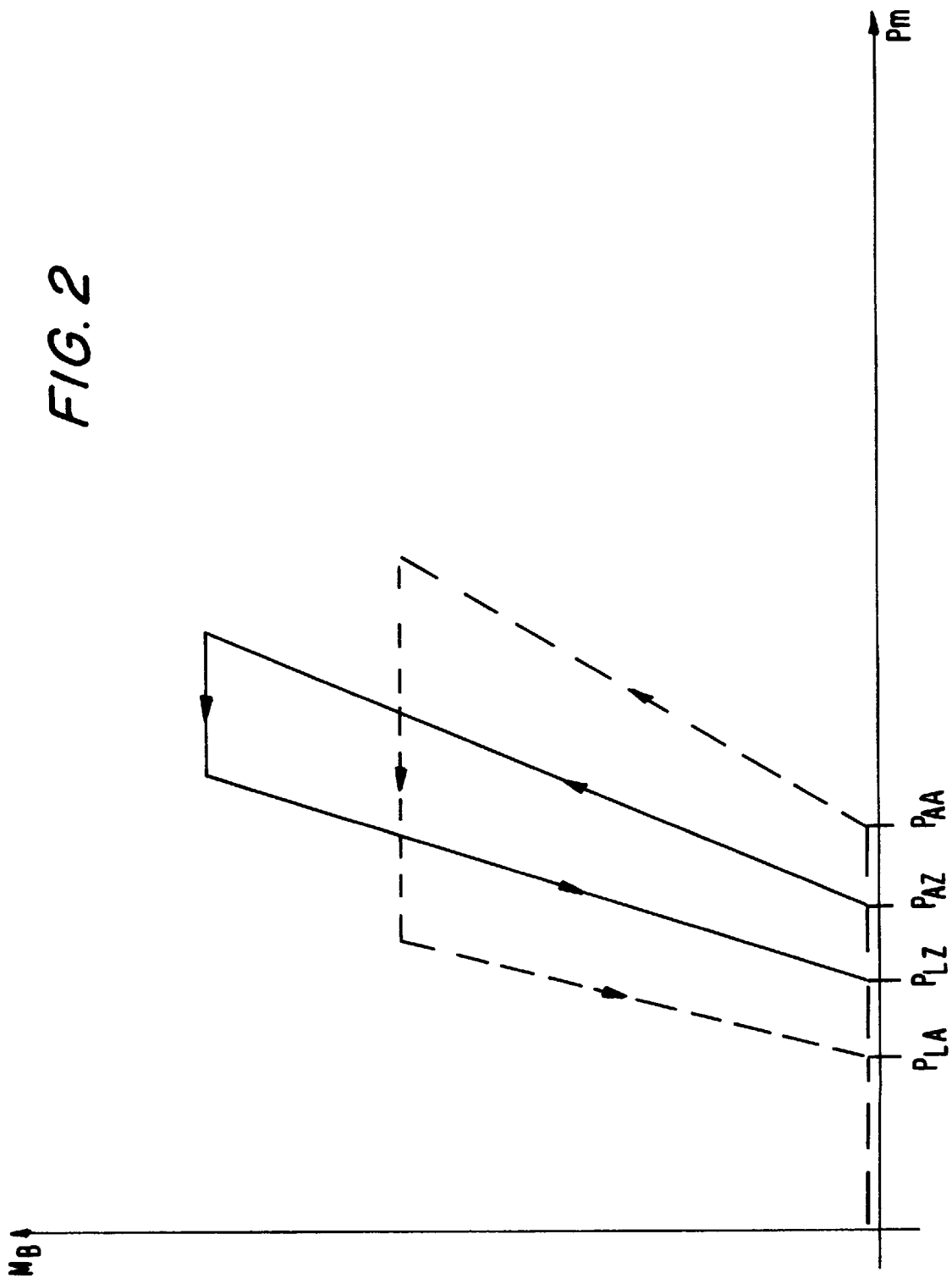

6,079,791

METHOD AND APPARATUS FOR CONTROLLING THE BRAKE SYSTEM OF A MOTOR VEHICLE

BACKGROUND OF THE INVENTION

The invention pertains to a method and to an apparatus for controlling the brake system of a vehicle.

A method and an apparatus for controlling a brake system are known from DE 4,112,845 A1. In the compressed-air brake system described there, the application pressure of the individual wheel brakes is determined by evaluation of the change over time in the braking pressures during an actuation of the brakes. The determined application pressure is used to correct the nominal pressure, derived from the driver's command, for the individual wheel brakes in such a way as to produce a braking force which is equal at all the wheels of the vehicle or at all the wheels of one axle. The corresponding measure can also be used to determine the release pressure when the brake is released. It has been found in this case that, when the hystereses (the difference between the pressure upon application and release of the brake) of the wheel brakes are different, the braking forces at the individual wheel brakes or at the brakes of individual component vehicles of a vehicle combination can differ widely at the time of application and at the time of release. This leads to different braking forces at the individual wheel brakes or within the individual component vehicles, which leads in turn to nonuniform wear of the wheel brakes and to longitudinal forces between the component vehicles. It is especially difficult to determine the application and release pressures in the case of trailers or semitrailers for which no information is available concerning the current condition of the wheel brakes.

The task of the invention is to provide measures for determining and suitably compensating the actuating variables for application and/or release (e.g., the application and/or release pressures in the case of compressed-air brake systems) or the application and/or release points of the brakes of a vehicle combination.

This object is achieved by the invention herein.

ADVANTAGES OF THE INVENTION

The solution according to the invention guarantees an accurate determination of the actuating application or release variable of a trailer or semi trailer.

It is an advantage that, for this determination, there is no need for information to be available concerning the current condition of the brakes of the trailer/semitrailer. As a result, the actuating application and release variables can be determined even for trailers or semitrailers which have a conventional pneumatic brake system. The braking process of the vehicle train consisting of a tractor with an electrically controlled brake system and a trailer or semitrailer with a conventional brake system is therefore significantly improved.

It is especially advantageous that, as a result of the solution according to the invention, no additional sensors or switches are required; on the contrary, the sensors which are present in any case in a tractor with an electronically controlled brake system are sufficient in themselves.

Another advantage is that, if an especially simple design is desired, measures for effectively controlling the brake system of the trailer or semitrailer can be omitted, and the operation with the trailer can be carried out during normal braking processes without impairment to the braking process or to comfort.

It is especially advantageous that the actuating variables for application or release can be determined even while the vehicle train is in operation and while the trailer or semitrailer is attached.

When the actuating variable for the application or release of the brake of the trailer or semitrailer is used for brake control, the longitudinal forces between the component vehicles of the vehicle train are considerably reduced. As a result, no additional information on the actual braking forces in effect are required. Thus there is no need to know the total weight of the vehicle, the gradient of the road, or the braking torque of a retarder, provided that this changes so slowly that no inflection is caused in the deceleration curve.

The use of the solution according to the invention is advantageous both in the case of trucks with semitrailers and in the case of trucks with draw-bar trailers.

Additional advantages can be derived from the following description of exemplary embodiments.

BRIEF DESCRIPTION OF THE DRAWINGS

FIG. 2 explains the brake hystereses of the tractor and its trailer on the basis of a suitable example.

DESCRIPTION OF EXEMPLARY EMBODIMENTS

Figure 1:
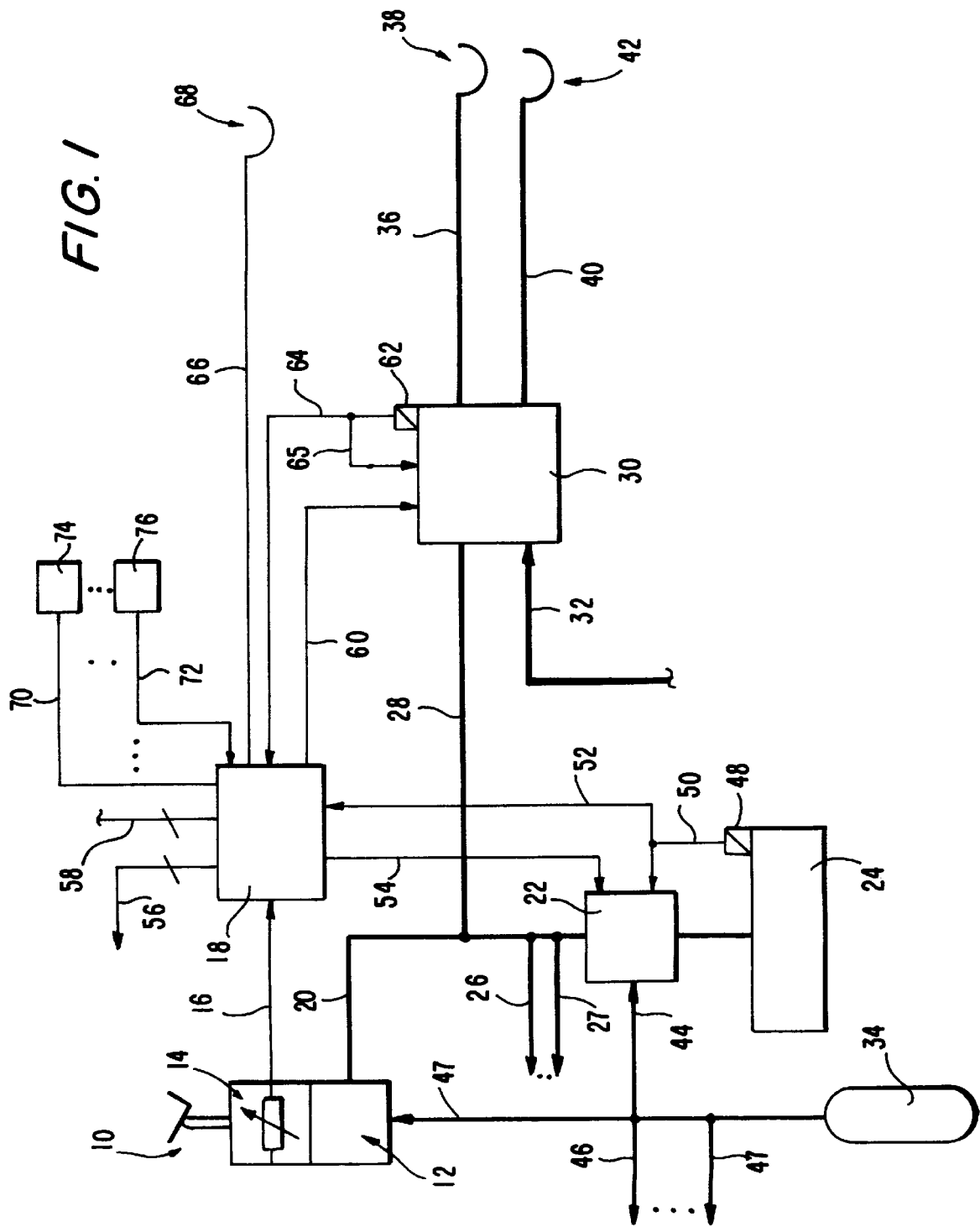
FIG. 1 shows a part of an electrically controlled brake system of a tractor vehicle.

FIG. 1 shows a part of an electrically controlled, pneumatic brake system of a tractor vehicle. A service brake valve 10, which can be actuated by the driver and which has a pneumatic part 12 and an electrical part 14, is shown. The electrical part consists preferably of a distance sensor, which transmits a signal representing the degree to which the brake pedal has been actuated over a line 16 to an electronic control unit 18. Leading from pneumatic part 12, which is connected by way of a supply line 47 to a pressure supply tank 34, is a pneumatic line 20, which leads to a pressure control module 22 of a wheel brake cylinder of a wheel brake 24. The other wheel brakes (not shown) of the tractor vehicle are also provided with pressure control modules, to which lines 26–27, branching from line 20, lead. In addition, a pneumatic line 28 leads from line 20 to a trailer control module 30. By way of a line 32, supply pressure is sent to this module from pressure supply tank 34. By way of pneumatic control line 36, trailer control module 30 is connected to a coupling head 38 for the control pressure of the trailer. Another line 40 leads from trailer control module 30 to a coupling head 42 for the supply pressure of the trailer. Automatic pressure control module 22 of wheel brake 24 is connected by a line 44 to supply pressure tank 34. This also applies to the other wheel brakes (not shown), to which supply pressure is supplied through lines 46–47. A pressure sensor 48 to detect the braking pressure produced in the wheel brake cylinder is provided near the wheel brake cylinder of wheel brake 24 or near pressure control module 22. This sensor is connected by way of an electrical line 50 to pressure control module 22 and via a line 52 to electronic control unit 18. The control unit is connected in turn by way of an output line 54 to pressure control module 22. Corresponding input and output lines are also provided for the other wheel brakes (not shown; see lines 56 and 58). Another output line 60 from electronic control unit 18 leads to trailer control module 30. The trailer control module has a pressure sensor 62, which can also be installed near pneumatic control line 36 or near coupling head 38, and this sensor is connected by way of line 64 to electronic control unit 18 and possibly via line 65 to trailer control module 30. In addition, the electronic control unit also has an output line 66, which leads to an electrical plug connector 68 for the trailer. Additional input lines 70–72 from measuring devices 74–76 for detecting additional operating variables which are evaluated for the control of the brake system, such as wheel velocities, axle loads, etc., are also connected to electronic control unit 18.

Under normal operating conditions, electronic control unit 18 detects the degree of actuation of the brake pedal by way of its input line 16. In correspondence with a preselectable braking force distribution between the front and rear axle of the tractor and between the tractor and the trailer, electronic control unit 18, possibly under consideration of the axle load values, converts this degree of actuation into nominal braking pressure values, which are sent via lines 54, 56 to the automatic pressure control modules of the wheel brakes of the tractor and via line 60 to the trailer control module. The automatic pressure control modules of the wheel brakes and the trailer control module, possibly under correction by an antilock controller, then adjust the pressures to match the predetermined nominal values within the scope of an automatic pressure control circuit. The control pressure transmitted via control line 36 to the trailer by automatic electrical control actuates the wheel brakes of the trailer. If there is a defect in the electronic system, the brake system switches over to a conventional pneumatic control.

Tractor vehicles which are equipped with electronically controlled compressed-air brakes are frequently combined with trailers or semitrailers which have a conventional pneumatic brake system. The additional relay valves and long line lengths of the trailer or semitrailer brake system, however, bring about a significant increase in the brake hysteresis of the trailer with respect to the tractor. Typical brake hystereses are shown in FIG. 2. There, the braking torque $M_B$ of a wheel is plotted versus the produced pressure $P_m$. The solid lines show the hysteresis of the tractor; the broken lines that of the trailer. In addition, FIG. 2 shows the application pressures $P_{AA}$ of the trailer and $P_{AZ}$ of the tractor and also the release pressures $P_{LZ}$ of the tractor and $P_{LA}$ of the trailer. The result of these unequal brake hystereses of the component vehicles is a nonuniform distribution of the braking forces between the tractor and the trailer or semitrailer. This causes nonuniform wear and nonuniform heating of the brake linings of the two component vehicles as well as a lack of braking comfort.

It has been found that the braking process can be optimized through a determination of the application and/or release pressures of the tractor and trailer brakes. Therefore, according to the solution of the invention, at least the application and/or release pressures of the trailer brakes are determined during a braking process while the vehicle is in operation. The braking pressure in coupling head 38 is then modified in such a way that the differences in the application pressures and/or release pressures are compensated, that is, in such a way that the brakes of the two component vehicles are applied and released at the same pressure values. Thus the offset error, which originates from differences between the application and/or release pressures of the component vehicles, is corrected.

To implement the solution according to the invention for detecting the application and/or release pressures of the trailer or semitrailer, the following minimum conditions must be fulfilled. The tractor vehicle must have wheel speed sensors and pressure sensors in the brake cylinders. The tractor has an electronically controlled brake system. During the measurement process, that is, at the beginning of the braking process and during the release of the brake, but not during the entire duration of the braking process, the braking caused by a retarder must be prevented or the additional deceleration of the vehicle as a whole caused by the retarder must be known. This condition does not apply in cases where the forces of the retarder change so slowly that they do not significantly affect the deceleration curve. The procedure according to the invention requires no measurement signals from the trailer vehicle and no knowledge of the gradient of the road and, in an especially simple exemplary embodiment, no knowledge of the pressure in the coupling head leading to the trailer and no control device for modifying the pressure in the coupling head.

The solution according to the invention can be improved by using an electronically actuated control device to adjust the pressure in the coupling head and by providing a pressure sensor in the coupling head in the area of the pressure control line leading to the trailer or in the area of this control device. The following description of a preferred exemplary embodiment of the solution according to the invention is based on a brake system of the type illustrated in FIG. 1.

The first step is to determine the application and/or release pressures of the brakes of the tractor. This can be done either on a brake test bench or during the operation of the vehicle with or without its trailer. Appropriate methods are known from the state of the art such as that cited above by way of example. Because these pressure values, as experience has shown, usually change only very slowly over the service life of the vehicle and are in particular independent of the load or of the presence or absence of a trailer, it is advisable for the pressures, once they have been determined, to be stored in battery-backed RAM or an electrically programmable ROM.

When, for example, the trailer or semitrailer is replaced, it is therefore possible to begin, without loss of time, with the recognition process for the trailer application and/or release pressure. If the application and/or release pressures of the tractor are sufficiently stable over the course of its service life, it is sufficient to determine these values on a brake test bench before the vehicle is put into service and to store them in a ROM, which can be programmed by means of an appropriate tester device.

Once the application and/or release pressures of the tractor are known, the application and/or release pressures of the trailer brakes are determined on the basis of the pressure and deceleration curves during braking operations under normal driving conditions. Simultaneously, the difference with respect to an application and/or release pressure of the tractor derived from the pressure values is compensated.

In the following, the method is described on the basis of the recognition and compensation of the application pressure of the trailer as an example. A tractor with an apparatus for modifying the coupling head pressure (trailer control module 30) is assumed.

Figure 3A:
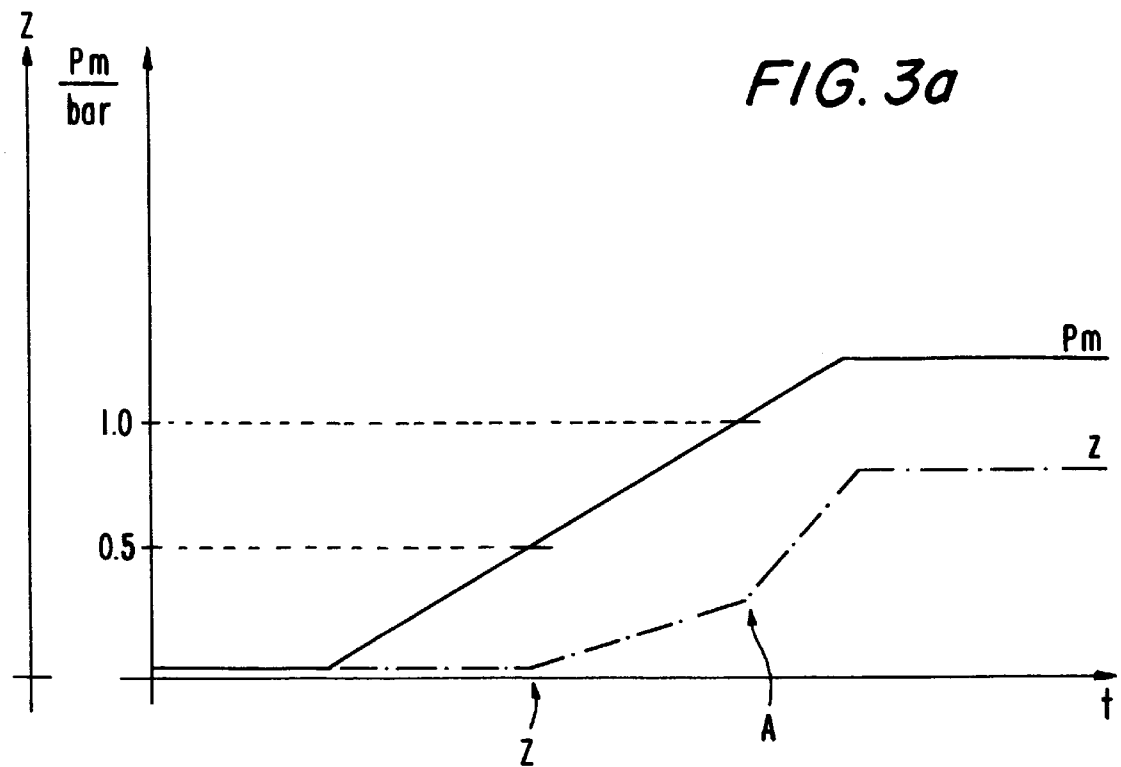
FIGS. 3a and 3b show time diagrams describing the principal relationships involved in the control of the trailer during a typical braking process.
Figure 3B:
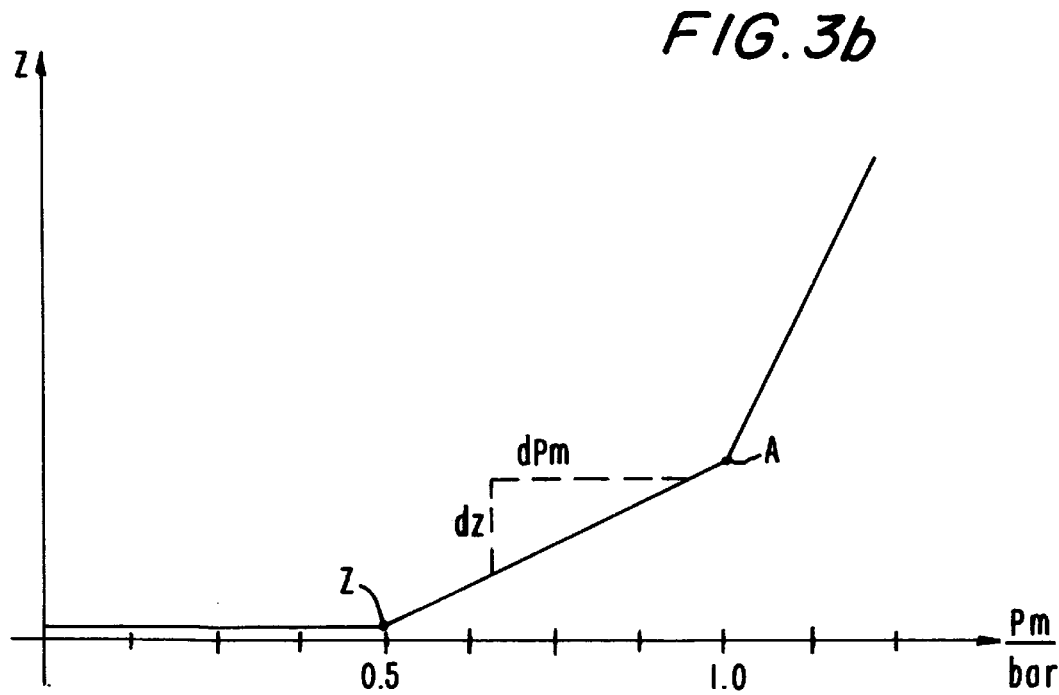

FIG. 3a shows the change over time in the pressure $P_m$ and in the deceleration z of the tractor during a typical braking operation with brake hystereses such as those illustrated in FIG. 2. As examples for application pressures, 0.5 bar is assumed here for the tractor and 1.0 bar for the trailer. The application points in the two component vehicles (Z for the tractor and A of the trailer) are clearly recognizable in the deceleration curve as inflection points. When, as seen in FIG. 3b, the deceleration is plotted as a function of the pressure in the coupling head, we obtain the typical curve shown there. The assumption on which this curve is based is a sufficiently flat pressure increase $dP_m/dt$, because only then are the dead times caused by the length of the lines in the trailer negligible. As a characteristic for recognizing the application points in the component vehicles, the gradient $dz/dP_m$ is suitable. As long as no brake has engaged, the gradient is virtually zero (see FIG. 3b in the area <0.5 bar). As soon as at least one of the two component vehicles brakes engages, the gradient becomes greater than zero. This behavior is exploited in the recognition and compensation strategy for the application pressure. Only braking operations with a sufficiently flat braking pressure curve are evaluated, and the deceleration is shown as a function of the coupling head pressure.

Figure 4A:
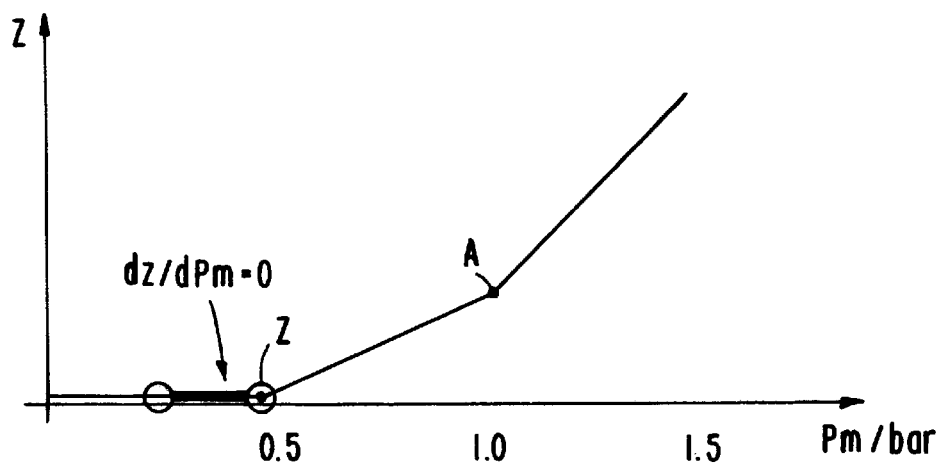
FIGS. 4a, 4b, and 4c shows diagrams representing the solution according to the invention for determining the application pressure.

The corresponding procedure is sketched on the basis of the diagrams of FIG. 4a, b, and c. FIG. 4a shows the original state. Again, an application pressure of 0.5 bar is assumed for the tractor and of 1.0 bar for the trailer. The application points are again designated Z and A. The application pressure of the tractor is known, whereas the application pressure of the trailer is yet to be determined.

During the braking operation, the gradient $dz/dP_m$ is now calculated in a pressure range below 0.5 bar, that is, before the brake of the tractor engages. This range is emphasized in FIG. 4a. In the present case, let the gradient be zero. Accordingly, the trailer brake obviously does not engage until a pressure which is above the application point of the tractor. Therefore, for the next braking operation, the braking pressure of the trailer is increased with respect to that of the tractor vehicle by an offset value $\Delta P_m$. This means that the nominal pressure transmitted to the trailer control module is increased by this offset value. The width of the steps used for increasing the pressure in the trailer is typically 0.1–0.2 bar.

Figure 4B:
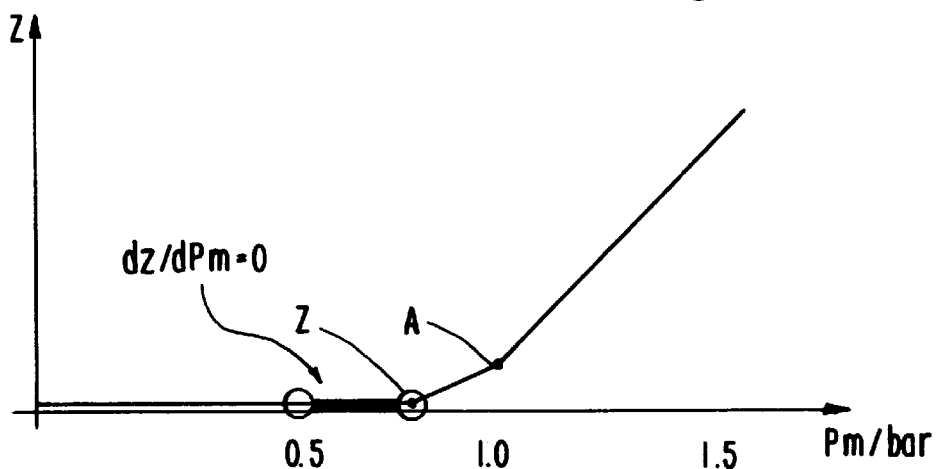

FIG. 4b shows the course of the deceleration process versus the pressure in the coupling head after the pressure offset for the trailer has already been increased in several steps to 0.3 bar. The application point of the trailer remains unchanged at 1.0 bar, because it is not possible to exert any control over the brake system of the trailer. But because the pressure in the coupling head now leads the pressure in the tractor by the offset of 0.3 bar, the pressure in the coupling head has already reached 0.8 bar by the time the tractor brakes engage. Accordingly, inflection point Z in the curve caused by the tractor is shifted toward the right. The gradient $dz/dP_m$ is again calculated in a range below this inflection point. Because the application point of the trailer brakes is still situated to the right of point Z, there is still no recognizable slope of $dz/dP_m$. The pressure offset $\Delta P_m$ must therefore be increased again.

Figure 4C:
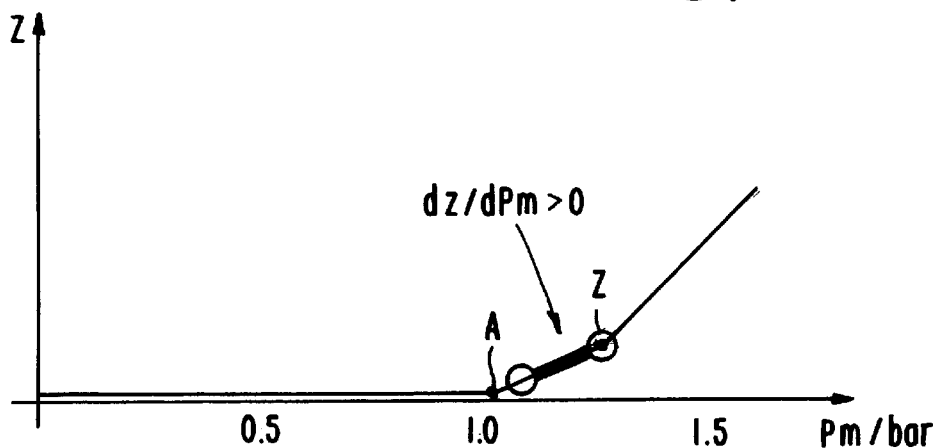

In FIG. 4c, the pressure offset for the trailer has finally been increased to such a extent that inflection point Z, which corresponds to the application point of the tractor brakes, is located to the right of application point A of the trailer brakes. Accordingly, we now see in this situation a gradient $dz/dP_m>0$. This leads to a decrease in the pressure offset $\Delta P_m$.

In this way, a pressure offset for the trailer braking pressure is obtained which leads to the goal that the brakes of both component vehicles engage at the same pressure value in the coupling head. The offset error caused by the difference between the application pressures is therefore compensated.

In a preferred exemplary embodiment, the procedure described above is realized as a program running on a microcomputer, which is incorporated into control unit 18.

Figure 5:
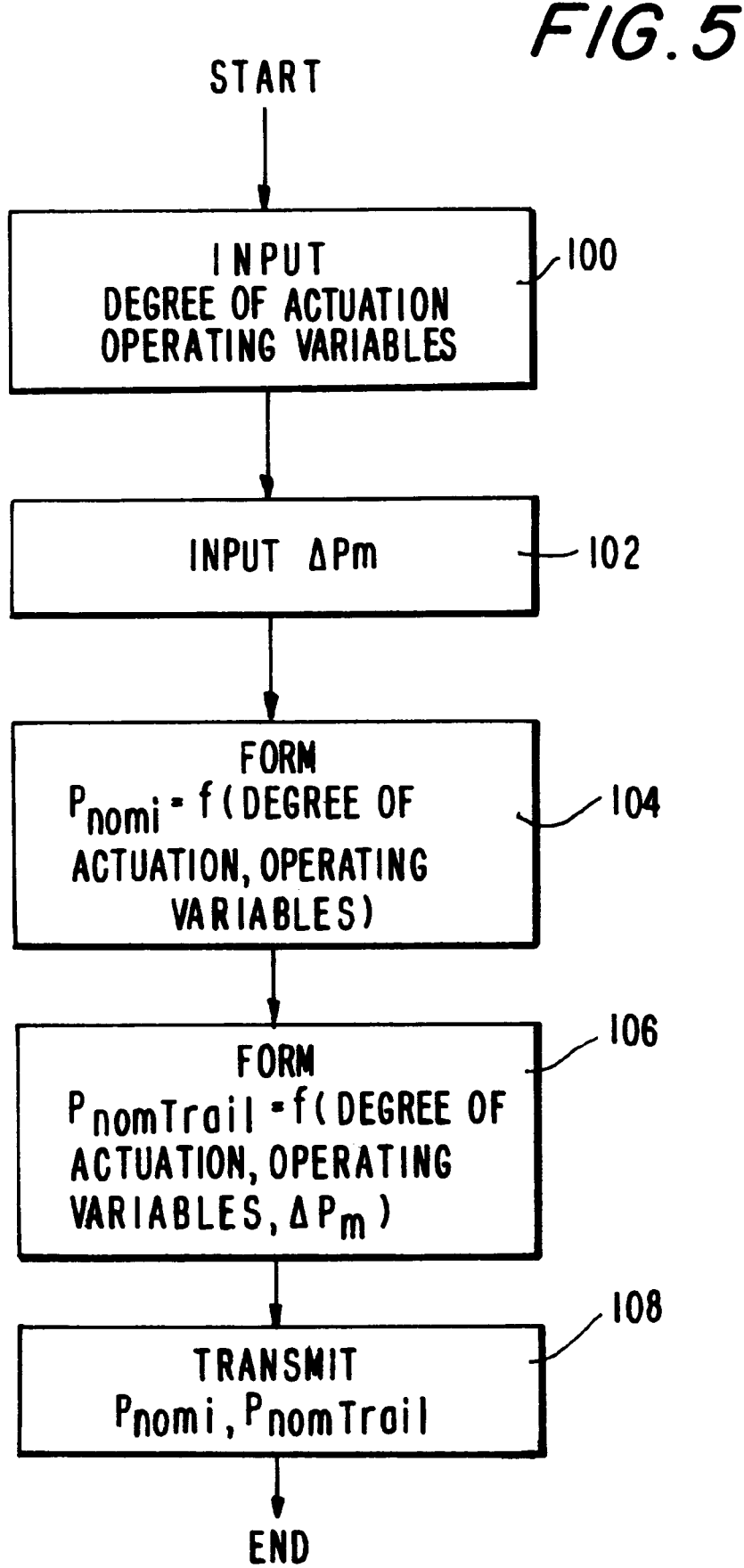
FIG. 5 shows a flow diagram, which illustrates how the determined application pressure value for the trailer is used to control the brake system.

The flow diagram shown in FIG. 5 illustrates how the brake system is controlled under consideration of the changeable offset value $\Delta P_m$. The subprogram described is called at given intervals. In the first step 100, the degree of actuation of the brake pedal and the operating variables such as the axle load values required to form the nominal values are accepted as input. In the next step 102, the offset value $\Delta P_m$ stored for the trailer, which was determined within the scope of the identification described in the following, is accepted as input. In the following step 104, the nominal values $P_{nomi}$ for the wheel brakes of the tractor are formed in accordance with predetermined characteristic curves or characteristic fields on the basis of the degree of actuation of the brake pedal, the determined application pressures, and possibly the inputs of the operating variables. In the next step 106, the nominal pressure value $P_{nomTrail}$ for the trailer or semitrailer is formed on the basis of characteristic fields or characteristic curves as a function of the degree of actuation of the brake pedal, the offset value $\Delta P_m$ which was read in, and possibly the operating variables. In a preferred exemplary embodiment, the offset value is added to the nominal value found as a function of the degree of actuation and possibly of the operating variables. In the following step 108, the determined nominal values are transmitted to the automatic control devices (automatic pressure control modules, trailer control module). The subprogram then terminates and is repeated again at the proper time.

Figure 6:
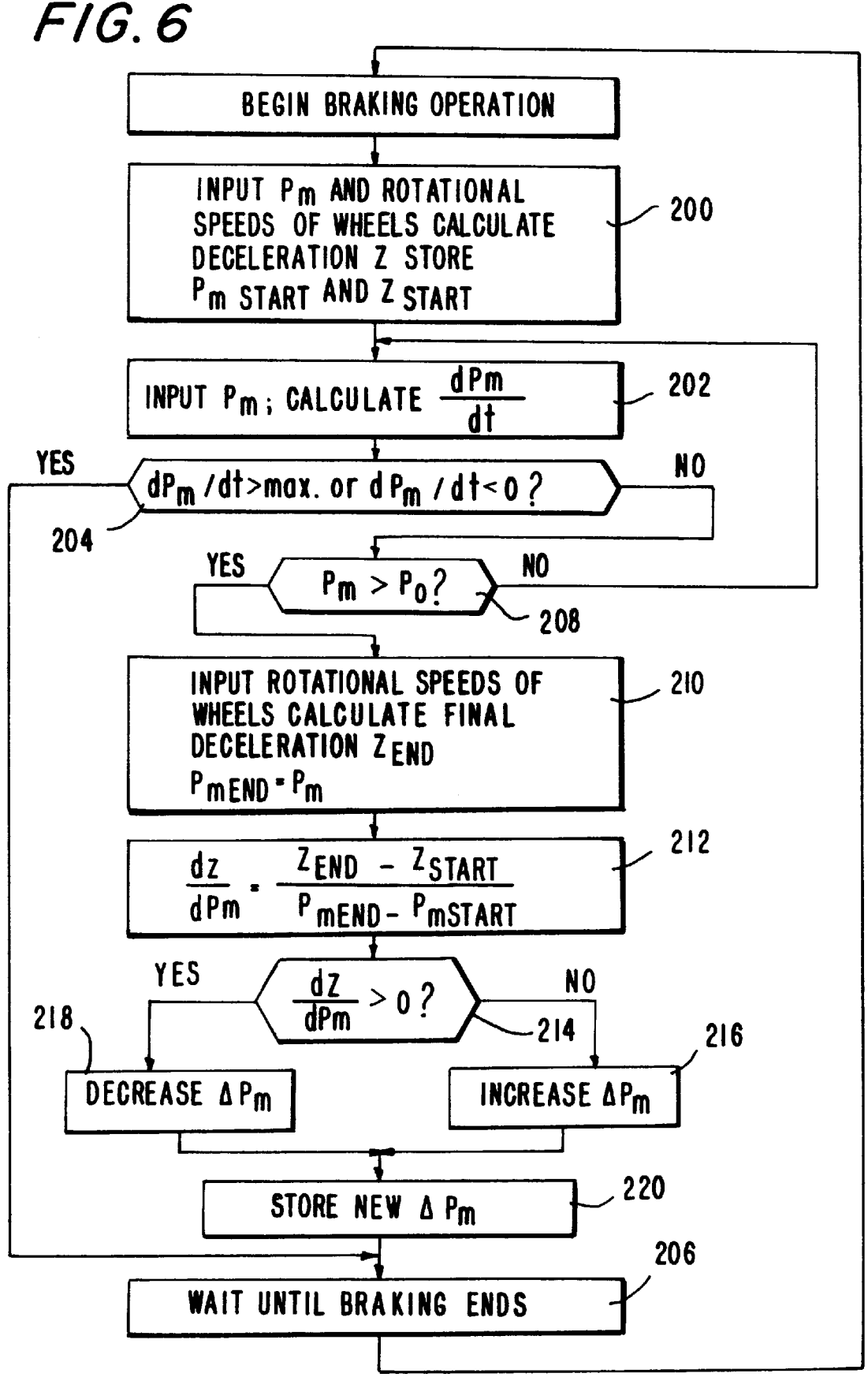
FIG. 6 shows a flow diagram on the basis of which the determination of the application pressure is explained in greater detail.

On the basis of a flow diagram, FIG. 6 shows an example of the realization of a program for identifying the application pressure of the trailer or semitrailer. The program shown in FIG. 6 is started with the beginning of each braking process after actuation of the brake pedal. In an exemplary embodiment, it is assumed that a braking process has begun when the pressure $P_m$ in the area of the coupling head is greater than a certain pressure derived from a predetermined pressure value $P_0$. In the first step 200, the measurement value $P_m$ for the pressure near the coupling head to the trailer is determined; the rotational speeds of the wheels are read in; and the deceleration of the tractor is calculated from these values. In addition, the starting values for the coupling pressure $P_{mstart}$ and the deceleration $Z_{start}$ are stored. Thereupon, in step 202, the pressure $P_m$ is read in, and the time gradient of this pressure is formed on the basis of the measured pressure value and a pressure value which had been derived from a previous run-through of the program (zero, during the first run) and stored temporarily. If the gradient $dP_m/dt$ is greater than a predetermined threshold value $dP_m/dt_0$ or less than zero (step 204), the identification of the trailer application pressure cannot be carried out meaningfully. Therefore, the offset value $\Delta P_m$, which had been determined over the course of preceding braking operations, remains stored (or, if this is the first identification, the value zero is stored), and the subprogram is suspended until the completion of the braking operation (step 206). The program starts again from the beginning with the beginning of the next braking operation. If the test in step 204 has shown that the change over time in the pressure $P_m$ is below the predetermined threshold value, then in the following step 208 the program checks to see whether the absolute value of this pressure $P_m$ is greater than a predetermined threshold value $P_0$, which, in the preferred exemplary embodiment, corresponds to the application pressure of the brakes of the tractor or to a selected application pressure of the tractor. If this is the case, then in step 210 the deceleration z of the vehicle is calculated on the basis of the rotational speeds of the wheels of the tractor. This deceleration value represents the final deceleration value $Z_{end}$. The final pressure value $P_{end}$ is set to the pressure $P_m$ which was accepted as input in step 202. Under consideration of the starting values, the gradient $dz/dP_m$ is calculated in step 212. In the preferred exemplary embodiment, the gradient is formed by dividing the difference between the final deceleration and the starting deceleration by the difference between final pressure in the area of the coupling head and the starting pressure. In the following test step 214, the program checks to see whether the gradient is greater than zero (possibly plus a tolerance value Δ). If it is not, the trailer brakes have not engaged, so that, in step 216, the offset value $\Delta P_m$ is increased by the predetermined amount. If it is found in step 214 that the gradient is greater than zero (possibly plus a tolerance value), then in step 218 the offset value $\Delta P_m$ is reduced by the predetermined amount. Then the offset value is stored in step 220. The subprogram is then ended until the completion of the braking operation. If it has been found in step 208 that the pressure is less than $P_0$, the subprogram loops back to step 202. The offset value and thus the application pressure of the trailer are therefore found, and the offset value which has been modified in step 216 or step 218 is then stored in step 220.

The solution according to the invention, furthermore, can be used to determine the release pressure of the trailer brakes either in addition or as an alternative to the determination of the application pressure of the trailer brakes. To identify and compensate the release pressure of the trailer or semitrailer, a procedure similar to that described above is used. In this case, it can be necessary for the pressure in the coupling head to be reduced slowly upon release of the brake, because it is normal practice for the driver to release the brake pedal very quickly, and thus no brakings with a sufficiently flat pressure gradient are available for the identification process. In principle, the nominal pressure value for the trailer brake system will also be modified by an offset value as part of the process for determining the release pressure; upon completion of the identification process, this offset will correspond to the release pressure of the trailer brakes. Identification is again carried out during braking operations with small pressure gradients (slow release of the brake pedal), where the absolute pressure is less than the known release pressure of the tractor. The release of the trailer brakes is derived from the gradient $dz/dP_m$. A corresponding procedure is outlined in the flow diagram of FIG. 7, which corresponds essentially to the procedure according to FIG. 6. The nominal pressure value for the trailer is modified by the offset value determined by a program corresponding to FIG. 5, which is initiated upon release of the brake (pressure reduction).

Figure 7:
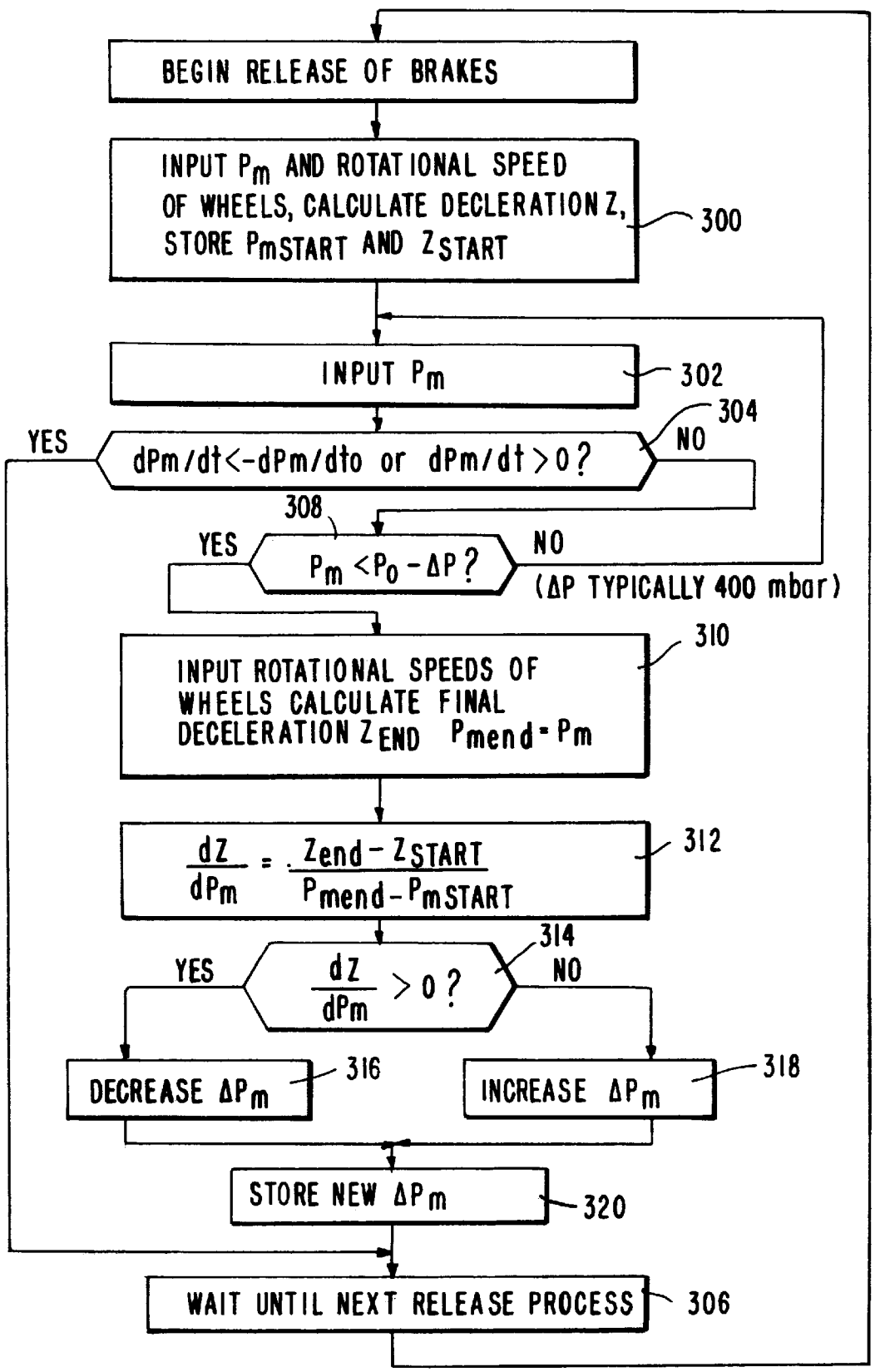
FIG. 7 shows the procedure used to determine the release pressure.

The program shown in FIG. 7 is initiated when the brake is released, that is, when the pressure in the coupling head falls below a value $P_0$. In the first step 300, the pressure $P_m$ in the area of the coupling head is accepted as input in a manner similar to that of step 200; the rotational speeds of the wheels are read in; the deceleration z is calculated; the starting values $P_{mstart}$ and $Z_{start}$ are set and the gradient of pressure $P_m$ is calculated. In the next step 302, pressure $P_m$ is accepted as input. Then, in step 304, the program checks to see whether the gradient is below a predetermined limit value or greater than zero. It must kept in mind here that, during a release process, the gradient assumes negative values. If the gradient is below the predetermined threshold value, the current offset value $\Delta P_m$ is stored or held in memory; the subprogram is suspended in step 306 and not started again until the next time the pedal is released. If it has been found in step 304 that the predetermined condition for the pressure gradient is present, the program checks in step 308 to see whether the absolute value of pressure $P_m$ is greater than the pressure value $P_{LZ}$, the release pressure of the tractor. In an exemplary embodiment, the pressure value is derived from pressure $P_0$ by subtracting a value $\Delta P$ (typically 400 mbar). If the pressure is greater, the subprogram loops back to step 302; otherwise, the deceleration z of the vehicle train is determined in step 310 from the rotational speeds of the wheels accepted as input, and the final values $Z_{end}$ and $P_{mend}$ are set. In step 312, the gradient $dz/dP_m$ is calculated. In the same way as in step 214, this gradient is then tested in step 314 to see whether it has exceeded the value of zero (possibly plus a tolerance value). If it does exceed zero, this means that the trailer brakes have not yet been released, so that, in step 316, the offset value $\Delta P_m$ is reduced. If the gradient is equal to zero or within the tolerance range, this means that the trailer brakes are released before those of the tractor. This means that the offset value $\Delta P_m$ is increased (step 318). After step 316 or 318, the offset value $\Delta P_m$ is stored in step 320. Then, in step 306, the subprogram is suspended until the next time a release operation occurs.

The exemplary embodiment described above is based on a tractor brake system which has a trailer control module, that is, a device for detecting and effectively changing the pressure in the coupling head to the trailer. The method described above, however, is also applicable to brake systems in which such devices are not present. Then, instead of the measurement value $P_m$ for the pressure in the area of the coupling head, the nominal pressure of the service brake valve derived from the position of the brake pedal on the basis of a characteristic curve is used. Because the pressure in the coupling head cannot be effectively changed, it is necessary, instead of adding the pressure offset $\Delta P_m$ for the coupling head pressure, to add a corresponding negative offset $\Delta PZ = \Delta P_m$ to the nominal pressure value for the tractor brakes. Accordingly, it is not the trailer pressure which is adjusted to the tractor but rather the pressure in the tractor brakes which is adjusted to the trailer brake system.

In addition, the goal in more modern brake systems, at least in the range of small decelerations, is suitably to combine the braking action produced by the friction brake and that produced by the retarder so as to achieve a further reduction in the wear of the brake linings. If a retarder of this type is provided, the deceleration zd it produces, which is calculated from the engine rpm's or the input rpm's of the retarder and the weight of the vehicle, must be subtracted from the total deceleration z calculated from the rotational speeds of the wheels before the identification method described above is implemented. Another possibility of solving this problem consists in preventing the combined use of the retarder and the friction brake during the process of identifying the application and/or release pressure for the trailer brakes. That is, during the measuring process in question, the retarder is turned off.

The solution according to the invention has been presented above on the basis of an electrically controlled pneumatic brake system. The same sorts of problems also occur, however, in electrically controlled hydraulic brake systems and in automatically controlled brake systems in which electric motors actuate the brakes. In the latter case, pressure values are not used. Instead, values representing the current used to drive the electric motors which actuate the brakes are formed and evaluated in a corresponding manner.

In this context, instead of application and release pressures, the more general terms "application actuating variable" and "release actuating variable," or "application point" and "release point" are used, which designate respectively the pressure, current, or comparable variable necessary for the application of the brakes and the pressure, current or comparable variable at which the brakes are released.

What is claimed is:

1. A method for controlling braking of a vehicle having first and second component vehicles each having a brake system with wheel brakes in a respective vehicle component, at least one of said brake systems being electrically controlled, said method comprising:

determining actuation of a brake pedal by an operator of the vehicle;

generating nominal values for actuating variables for controlling the brake systems of respective component vehicles;

generating the actuating variable for controlling the brakes of the second vehicle component, including adjusting said actuating variable for the second vehicle component by a value which is determined while the brake system of said first component vehicle is not engaged by adjusting the actuating variable for the brake system of the second component vehicle or by adjusting the nominal values for the actuating variable for the brake system for the first component vehicle before the brakes of the first component vehicle have engaged.

2. The method according to claim 1, wherein the value corresponds to the difference between application points or release points of the wheel brakes of the component vehicles.

3. The method according to claim 1 wherein the value is determined by evaluation of deceleration of the vehicle.

4. The method according to claim 3, wherein when a retarder is used, the deceleration caused by the retarder being determined and taken into account in the determination of the deceleration of the overall vehicle combination.

5. The method according to claim 1, wherein, responsive to a recognition that said wheel brakes have engaged before the brakes of the first component vehicle, the value is decreased.

6. The method according to claim 1, wherein responsive to a recognition that the brakes of the second component vehicle have disengaged before the brakes of the first component vehicle, the value is increased, and, responsive to a detection that the brakes of the second component vehicle have not disengaged before the brakes of the first component vehicle, the value is decreased.

7. The method according to claim 1, wherein an actual value of the actuating variable is determined, the application or release of the wheel brakes of the second component vehicle being determined by evaluation of a gradient of deceleration versus the actual value.

8. The method according to claim 1, wherein the value is determined only when the gradient of the actuating variable for the second component vehicles does not exceed a predetermined threshold value.

9. The method according to claim 1 wherein the electrically controlled brake system is a pneumatic brake system, and the actuating variable for the second component vehicle is a pressure applied to a coupling head of a tractor for the second component vehicle.

10. An apparatus for controlling braking of a vehicle having first and second component vehicles each having a brake system with wheel brakes in a respective component vehicle, at least one of said brake systems being electrically controlled, said apparatus comprising:

an electronic control unit connected with a brake pedal of said vehicle, said electronic control unit detecting actuation of said brake pedal by a driver;

said electronic control unit generating nominal values derived from at least the actuation of the brake pedal for controlling the brakes of said component vehicles;

said electronic control unit transmitting to said brake systems of said first and second component vehicles respective actuating variables for controlling the brakes of said component vehicles;

said actuating variables each being derived from at least a respective nominal value;

said actuating variable for the second component vehicle being adjusted from said nominal value by a value determined while the wheel brakes of the first component vehicle are not engaged by adjusting the actuating variable for the second component vehicle or by adjusting the nominal value for the first component vehicle before the brakes of the first component vehicle have engaged.

11. The apparatus of claim 10 wherein the value corresponds to the difference between the application points of the first and second component vehicles.

12. The apparatus of claim 10 wherein the value corresponds to the difference between the release points of the first and second component vehicles.

13. The apparatus of claim 10 wherein the value is determined from evaluation of deceleration of the vehicle.

14. The apparatus of claim 10 wherein responsive to a recognition that the brakes of the second component vehicle have disengaged before the brakes of the first component vehicle, the value is increased, and, responsive to a detection that the brakes of the second component vehicle have not disengaged before the brakes of the first component vehicle, the value is decreased.

15. The apparatus of claim 10 wherein responsive to a recognition that the brakes of the second component vehicle have disengaged before the brakes of the first component vehicle, the value is increased, and, responsive to a detection that the brakes of the second component vehicle have not disengaged before the brakes of the first component vehicle, the value is decreased.

16. The apparatus of claim 10 wherein responsive to a recognition that the brakes of the second component vehicle have disengaged before the brakes of the first component vehicle, the value is increased, and, responsive to a detection that the brakes of the second component vehicle have not disengaged before the brakes of the first component vehicle, the value is decreased.

17. The apparatus of claim 10 wherein responsive to a recognition that the brakes of the second component vehicle have disengaged before the brakes of the first component vehicle, the value is increased, and, responsive to a detection that the brakes of the second component vehicle have not disengaged before the brakes of the first component vehicle, the value is decreased.

18. The apparatus of claim 10 wherein responsive to a recognition that the brakes of the second component vehicle have disengaged before the brakes of the first component vehicle, the value is increased, and, responsive to a detection that the brakes of the second component vehicle have not disengaged before the brakes of the first component vehicle, the value is decreased.

19. An apparatus for controlling braking of a vehicle including a tractor and a trailer each having wheel brakes, said apparatus comprising:

an electronic control unit detecting a degree of actuation of a brake pedal in the tractor by a driver and generating from said degree of actuation nominal values for a level of braking actuation for the wheel brakes of each said tractor and said trailer, and generating from each of said nominal values a respective actuating variable corresponding to a level of application of the brakes for each said tractor and said trailer;

a brake control unit operatively associated with the wheel brakes of said tractor and receiving from said electronic control unit said tractor actuating variable, said brake control unit causing said brakes of said tractor to be actuated responsive to said tractor actuating variable;

means connecting said electronic control unit with said trailer wheel brakes for causing the trailer brakes to apply a level of braking action corresponding to said trailer actuating variable;

said electronic control unit generating at least one of said actuating variables by modifying the respective nominal value by adding or subtracting therefrom an offset value corresponding to a difference determined between the levels of braking at which said tractor wheel brakes and the trailer wheel brakes engage or release;

said electronic unit deriving said difference by analyzing the gradient of deceleration of the vehicle relative to the level of braking applied.

20. The apparatus of claim 19 wherein said means for causing the trailer brakes to apply braking action including a pressure applied to a coupling head of the tractor.

21. Method for controlling a brake system of a vehicle comprising of at least a first and a second component vehicles, each having a brake system and a brake pedal with wheel brakes in a respective vehicle component where at least one of these component vehicles is equipped with an electrically controlled brake system, comprising the steps of:

determining as a function of an actuation of at least two nominal values (Pnomi, Pnomtrail) from said brake pedal, of an actuating variable for controlling the wheel brakes of the first and the second component vehicles;

determining a deceleration (Z) of the vehicle;

determining a value of the actuating variable (pm) for the second component vehicle;

adapting a modification value (Apm) depending on whether the wheel brakes of the second component vehicle have engaged before the wheel brakes of the first vehicle or whether the brakes of the second component vehicle have not engaged before the brakes of the first vehicle, such that engagement of the wheel brakes is determined based on the values of the deceleration and of the actuating variable; and modifying the nominal value (Pnomtrail) of the actuating variable for the second component vehicle by the modification value (Apm).

22. Method for controlling a brake system of a vehicle comprising of at least a first and second component vehicles each having a brake system with wheel brakes and a brake pedal in a respective vehicle component where at least one of these component vehicles is equipped with an electrically controlled brake system, comprising the steps of:

determining a deceleration (Z) of the vehicle;

determining a value of the actuating variable (pm) for the second component vehicle;

adapting a modification value (Apm) depending on whether the wheel brakes of the second component vehicle have disengaged before the wheel brakes of the first vehicle or whether the brakes of the second component vehicle have not disengaged before the wheel brakes of the first vehicle, such that disengagement of the wheel brakes is determined based on the values of the deceleration and of the actuating variable; and modifying the nominal value (Pnomtrial) of the actuating variable for the second component vehicle by the modification value (Apm).

23. An apparatus for controlling a brake system of a vehicle comprising of at least a first and a second component vehicle each having a brake system with a wheel brake and a brake pedal in a respective vehicle component where at least one of these component vehicles is equipped with an electrically controlled brake system, with an electronic control unit, which, as a function of the degree of an actuation of the brake pedal, determines at least two nominal values (Pnomi, Pnomtrail) of an actuating variable for controlling the wheel brakes of the first and the second component vehicle, and determines a deceleration (Z) of the vehicle, and further determines a value of the actuating variable (pm) for the second component vehicle, and adapts a modification value (Apm) depending on whether the wheel brakes of the second component vehicle have engaged before the wheel brakes of the first vehicle or whether the wheel brakes of the second component vehicle have not engaged before the wheel brakes of the first vehicle, whereas engagement of the wheel brakes is determined based on the values of the deceleration and of the actuating variable, and thereafter modifies the nominal value (Pnomtrail) of the actuating variable for the second component vehicle by the modification value (Apm).

24. An apparatus for controlling a brake system of a vehicle comprising of at least a first and second component vehicles each having a brake system with wheel brakes and a brake pedal in a respective vehicle component, where at least one of these component vehicles is equipped with an electrically controlled brake system, with an electronic control unit, which, as a function of an actuation of the brake pedal, determines nominal values (Pnomi, Pnomtrail) of an actuating variable for controlling the wheel brakes of the first and the second component vehicle, and determines a deceleration (Z) of the vehicle, and further determines a value of the actuating variable (pm) for the second component vehicle, and adapts a modification value (Apm) depending on whether the wheel brakes of the second component vehicle have disengaged before the wheel brakes of the first vehicle or wheel brakes of the second component vehicle have not disengaged before the brakes of the first vehicle, whereas disengagement of the wheel brakes is determined based on the values of the deceleration and of the actuating variable, and thereafter modifies the nominal value (Pnomtrail) of the actuating variable for the second component vehicle by the modification value (Apm).

* * * * *